US006172741B1

(12) United States Patent
Wotton et al.

(10) Patent No.: US 6,172,741 B1
(45) Date of Patent: Jan. 9, 2001

(54) VACUUM SURFACE FOR WET DYE HARD COPY APPARATUS

(75) Inventors: Geoff Wotton, Battleground, WA (US); Angela Chen, Portland, OR (US); Steve O. Rasmussen; John D Rhodes, both of Vancouver, WA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/292,838

(22) Filed: Apr. 14, 1999

(51) Int. Cl.[7] .................................................... G03B 27/60

(52) U.S. Cl. ................................ 355/73; 355/76; 355/47

(58) Field of Search ................................ 355/73, 76, 47, 355/85; 248/362, 363; 347/1, 5; 260/DIG. 38; 101/DIG. 36, 171; 346/140 R

(56) References Cited

U.S. PATENT DOCUMENTS

| | | | |
|---|---|---|---|
| D. 358,417 * | 5/1995 | Medin et al. | 346/140 R |
| 2,895,706 * | 7/1959 | Blatherwick | 355/73 |
| 3,307,817 * | 3/1967 | Cocoto | 355/73 |
| 3,617,127 | 11/1971 | McDuff | 355/73 |
| 4,145,040 | 3/1979 | Huber | 271/276 |
| 4,202,542 | 5/1980 | Lammers et al. | 271/276 |
| 4,237,466 | 12/1980 | Scranton | 346/75 |
| 4,294,540 | 10/1981 | Thettu | 355/76 |
| 4,378,155 * | 3/1983 | Nygard | 355/73 |
| 4,504,843 | 3/1985 | Prohl et al. | 346/138 |
| 4,792,249 | 12/1988 | Lahr | 400/578 |
| 4,878,071 | 10/1989 | Bibl et al. | 346/153.1 |
| 4,921,240 | 5/1990 | Watson | 271/245 |
| 4,926,199 | 5/1990 | Bibl et al. | 346/157 |
| 4,952,950 | 8/1990 | Bibl et al. | 346/157 |
| 4,982,207 | 1/1991 | Tunmore et al. | 346/138 |
| 5,037,079 | 8/1991 | Siegel et al. | 271/3 |
| 5,124,728 | 6/1992 | Denda | 346/134 |
| 5,183,252 | 2/1993 | Wolber et al. | 271/276 |
| 5,197,812 | 3/1993 | Worley et al. | 400/635 |
| 5,208,610 * | 5/1993 | Su et al. | 346/140 R |
| 5,243,379 * | 9/1993 | Lien | 355/85 |
| 5,294,965 | 3/1994 | May | 355/312 |
| 5,329,301 * | 7/1994 | Balzeit et al. | 346/134 |
| 5,383,001 * | 1/1995 | Bosy | 355/73 |
| 5,400,118 * | 3/1995 | Simon | 355/76 |
| 5,510,822 | 4/1996 | Vincent et al. | 347/102 |
| 5,578,874 * | 11/1996 | Morrisetti | 271/276 |
| 5,717,446 | 2/1998 | Teumer et al. | 347/35 |
| 5,771,054 | 6/1998 | Dudek et al. | 347/102 |

* cited by examiner

*Primary Examiner*—Russell Adams

(57) ABSTRACT

A platen surface structure construct, particularly useful in a hard copy apparatus for a vacuum holddown, is configured by dimensioning print media platen surface structure channels and ports in order to ensure print media leading edge and trailing edge holddown. Moreover, the vacuum is distributed across the platen surface in accordance with predetermined dye flow characteristics based upon known dye composition and known print medium composition and such that print artifacts are not created by vacuum pulling wet dye through the capillaries of the medium.

20 Claims, 4 Drawing Sheets

VACUUM SURFACE FOR WET DYE HARD COPY APPARATUS

RELATED APPLICATIONS

This application is related to co-filed U.S. patent application Ser. No. 09/292,125, by John D. Rhodes et al. for Vacuum Control for Vacuum Holddown (hereinafter "Rhodes"), and U.S. patent application Ser. No. 09/292,767, by Steve O. Rasmussen et al. for a Print Media Vacuum Holddown (hereinafter referred to as "Rasmussen").

BACKGROUND OF THE INVENTION

1. Field of the Invention

The present invention relates generally to vacuum holddown apparatus and method of operation and, more specifically to a cut-sheet print media vacuum holddown particularly useful for a wet dye hard copy apparatus, such as an ink-jet printer.

2. Description of Related Art

It is known to use a vacuum induced force to adhere a sheet of flexible material to a surface, for example, for holding a sheet of print media temporarily to a platen. [Hereinafter, "vacuum induced force" is also referred to as "vacuum induced flow," or just "vacuum flow," or more simply as just "vacuum" or "suction".] Such vacuum holddown systems are a relatively common, economical technology to implement commercially and can improve throughput specifications. For example, it is known to provide a rotating drum with holes through the surface wherein a vacuum through the drum cylinder provides a suction force through the drum surface. [The term "drum" as used herein is intended to be synonymous with any curvilinear implementation incorporating the present invention, whether a full cylinder as shown in the exemplary embodiment, a semi-cylinder embodiment, hemispherical embodiment, or the like, as would be recognized by a person skilled in the art. While the term "platen" can be defined as a flat, or planar, holding surface, in hard copy technology it is also used for curvilinear surfaces, such as a common typewriter rubber roller; thus, for the purposes of the present application, "platen" is used generically for any shape paper holddown surface used in a hard copy apparatus.] In a hard copy apparatus, such as a copier or a computer printer, a platen is used either to transport cut-sheet print media to an internal printing station or to hold the sheet media at the printing station while images are formed, or both. [In order to simplify discussion, the term "paper" is used hereinafter to refer to all types of print media; no limitation on the scope of the invention is intended nor should any be implied.] One universal problem is the management of different sized paper. Open holes around the edges of a sheet smaller than the dimensions of the vacuum field in the platen surface results in vacuum losses for holding the paper. In other words, too many exposed vacuum ports results in a change of the flow forces in each vacuum port and a loss of holding pressure at paper sheet covered ports. Thus, a sheet of paper that is smaller than the total vacuum field may not be firmly adhered to the surface. Known apparatus generally rely on a user manually switching operational functions to adjust the vacuum field to match the size of the paper in current use.

Another problem has become evident as attempts have been made to employ vacuum for holding paper in "wet dye" printing environments, for example, in hard copy apparatus such as in an ink-jet printer that uses a liquid ink. [The term "wet dye" or just "dye" is used herein as generic for all such hard copy apparatus, whether employing ink (which may itself be dye-based or pigment-based), a wet toner, or other liquid colorant.] The art of ink-jet technology is relatively well developed. Commercial products such as computer printers, graphics plotters, copiers, and facsimile machines employ ink-jet technology for producing hard copy. The basics of this technology are disclosed, for example, in various articles in the Hewlett-Packard Journal, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994) editions. Ink-jet devices are also described by W. J. Lloyd and H. T. Taub in Output Hardcopy [sic] Devices, chapter 13 (Ed. R. C. Durbeck and S. Sherr, Academic Press, San Diego, 1988).]

For example, in an ink-jet printer with a drum surface platen employing a field of discrete vacuum areas, the localized vacuum pressure against regions of the underside of the paper adjacent the vacuum areas draws the wet dye through the capillaries of the paper material before the dye has time to set. This results in alternating dark and light concentrations of dye in the final image correlating to the individual vacuum force influence regions of the holes in the field. Non-uniform saturation leads to deformation of the paper as the ink dries, commonly known as "paper cockle." Moreover, in an ink-jet environment, vacuum forces through ports around the periphery of the paper could affect ink drop firing trajectories, resulting in misprints or random artifacts in the final image.

There is a need for a vacuum paper holddown that is suited for use in a wet dye printing environment.

SUMMARY OF THE INVENTION

In its basic aspects, the present invention provides a platen surface structure for a vacuum holddown of a hard copy mechanism for printing with wet dye on print media, the hard copy mechanism having a vacuum generating mechanism for producing a predetermined vacuum force. The structure includes: the vacuum holddown having a platen; the platen having a first surface for receiving print media thereon, the first surface having predetermined width dimension in a predetermined first axis of symmetry, and the first surface having a plurality of vacuum channels distributively arranged in parallel wherein each of the channels is substantially parallel to the first axis of symmetry, adjacent channels having substantially identical predetermined channel shape and channel dimensions; each of the channels has at least one vacuum port associated therewith, fluidically coupling each of the channels, respectively, to the vacuum generating mechanism, each of the channels are separated from adjacent channels thereto by platen surface structure ribs, wherein each of the ribs is substantially parallel to the first axis of symmetry, such that the ribs form a print media receiving surface; and the ribs having predetermined rib shape and rib dimensions and the channels have the predetermined channel shape and channel dimensions such that the vacuum force is distributed through the channels and imparted to regions of print media received on the ribs and spanning the channels to hold the print media to the platen first surface, wherein the first surface provides leading and trailing edge holddown on the platen.

In another basic aspect, the present invention provides a vacuum platen device for an ink-jet apparatus having a mechanism for producing a vacuum, Fv. The device includes: a platen having an outer platen surface and an inner platen surface wherein print media sheets are sequentially delivered to the outer platen surface from a predetermined media delivery direction, the platen having a first axis perpendicular to the predetermined media delivery direction and a second axis parallel to the predetermined media delivery direction; the outer platen surface having an outer platen surface structure having a repeated pattern of vacuum channels in the outer platen surface wherein each of the channels has a channel major axis substantially parallel to the first axis and a channel minor axis substantially parallel to the second axis; the outer platen surface structure having platen surface structure ribs, each of the ribs separating a pair of the vacuum channels, the ribs having a rib major axis substantially parallel to the first axis and a rib minor axis substantially parallel to the second axis; and each of the vacuum channels having a least one vacuum port from the outer platen surface to the inner platen surface, fluidically coupling each of the vacuum channels to the mechanism for producing a vacuum, respectively, and wherein the ribs have a predetermined rib shape and rib dimensions and the channels have a predetermined channel shape and channel dimensions such that the vacuum force is distributed through the channels and imparted to regions of the print media received on the ribs and spanning the channels to hold the print media to the outer platen surface, and wherein the platen further provides print media leading edge and print media trailing edge holddown.

In another basic aspect, the present invention provides an ink-jet hard copy apparatus having a mechanism for generating a predetermined vacuum force Fv. The apparatus including: a housing; mounted to the housing, mechanism for ink-jet printing; mounted to the housing, mechanism for holding cut-sheet print media; mounted within the housing and associated with the mechanism for holding cut-sheet print media, vacuum drum mechanism for sequentially transporting individual sheets of print media from the mechanism for holding to a printing station adjacent the mechanism for ink-jet printing; and the vacuum drum mechanism, having a predetermined longitudinal spin axis and a predetermined axial length and including an inner surface forming a vacuum chamber fluidically coupled to the mechanism for generating a vacuum force, an outer surface positioned adjacently to the mechanism for holding cut-sheet print media, forming a cylindrical platen for sequentially receiving individual sheets of media from the mechanism for holding, the outer surface including a plurality of vacuum channels across the outer surface, each of the channels having at least one vacuum port extending from an interior of a respective channel to the inner surface such that the predetermined vacuum force is coupled to each of the channels and distributed thereby across the platen, each of the channels having a predetermined channel length parallel to the spin axis and a predetermined circumferential channel width wherein the channel length is approximately equal to or less than the predetermined axial length of the drum mechanism and the circumferential channel width is less than a dimension, wherein the vacuum force distributed by respective channels provides leading edge and trailing edge holddown of the print media.

In still another basic aspect, the present invention provides a method for using a known vacuum force for holding print media during a wet dye printing operation, including the steps of: providing a platen having print media platen surface structure having vacuum channels oriented, shaped, and dimensioned across the platen in accordance with a predetermined geometry for ensuring leading edge and trailing edge holddown of the print media; delivering the print media to the platen; and holding the print media to the platen with the vacuum force distributed through the channels during printing.

It is an advantage of the present invention that it optimizes distribution of vacuum force across a sheet of print media.

It is an advantage of the present invention that it provides a vacuum holddown which does not draw wet dye from its initial deposition dispersion.

It is an advantage of the present invention that it causes less vacuum holddown deflection of print media, minimizing permanent deformation due to dye infusion and drying during printing operations.

It is an advantage of the present invention that it provides the ability to hold different size print media.

It is another advantage of the present invention that it provides the ability to hold media of different stiffnesses.

It is another advantage of the present invention that it reduces vacuum acoustic levels.

It is a further advantage of the present invention that it provides holddown of leading and trailing edges of stiff media on cylindrical or drum implementations.

It is a further advantage of the present invention that it minimizes variation in surface height of the media which in turn permits closer pen-to-media spacing which enables better print quality.

Other objects, features and advantages of the present invention will become apparent upon consideration of the following explanation and the accompanying drawings, in which like reference designations represent like features throughout the drawings.

BRIEF DESCRIPTION OF THE DRAWINGS

FIGS. 4A, 4B and 4C are a schematic depiction of a third embodiment in accordance with the present invention of a vacuum drum surface of a platen in the ink-jet hard copy apparatus as shown in FIG. 1, in which:

FIGS. 4A and 4B are a schematic depiction of a third embodiment in accordance with the present invention of a vacuum drum surface of a platen, and FIG. 4C is a perspective view of a section of drum in accordance with the embodiment of FIGS. 4A and 4B.

FIG. 5 is an ink-jet printer in accordance with the present invention.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

The present invention relates to holddown surfaces which may be used in conjunction with one or more different vacuum manifold systems as described in the literature. A variety of methods and apparatus for manifolding a vacuum to a flexible material holding surface are known in the art. [See e.g., U.S. Pat. No. 3,617,127 (McDuff) for a Photographic Material Transport with Vacuum Platen, U.S. Pat. No. 4,145,040 (Huber) for a Gripper Drum, the Lammers et al. U.S. Pat. No. 4,202,542 for an Apparatus for Handling Flexible Sheet Material of Different Sizes, the Prohl et al. U.S. Pat. No. 4,504,843 for a Surface Structure for the Drum of a Recording Device, U.S. Pat. No. 5,383,001 (Bosy) for a Vacuum Drum for Mounting Media of Different Sizes, or the Wolber et al. U.S. Pat. No. 5,183,252 for a Vaccum [sic] Drum for Different Sized Media.] The preferred embodiments for implementation are shown in assignee's co-pending Related Applications referenced hereinabove. In the basic aspects taught by Rhodes and Rasmussen, the platen can be either "valved," where automated mechanisms are provided to activate only platen vacuum apertures covered by the paper sheet, or "unvalved," where a vacuum is applied across the surface via constantly open vacuum apertures.

For convenience of explanation, the present invention will be described with respect to exemplary embodiments comprising hard copy apparatus using cut-sheet print media and as disclosed herein with respect to a preferred embodiment, having a full drum platen. It is to be recognized that the invention has a wider applicability. The use of hard copy apparatus exemplary embodiments is not intended as a limitation on the scope of the invention, nor should any such limitation be implied therefrom.

Figure 1:
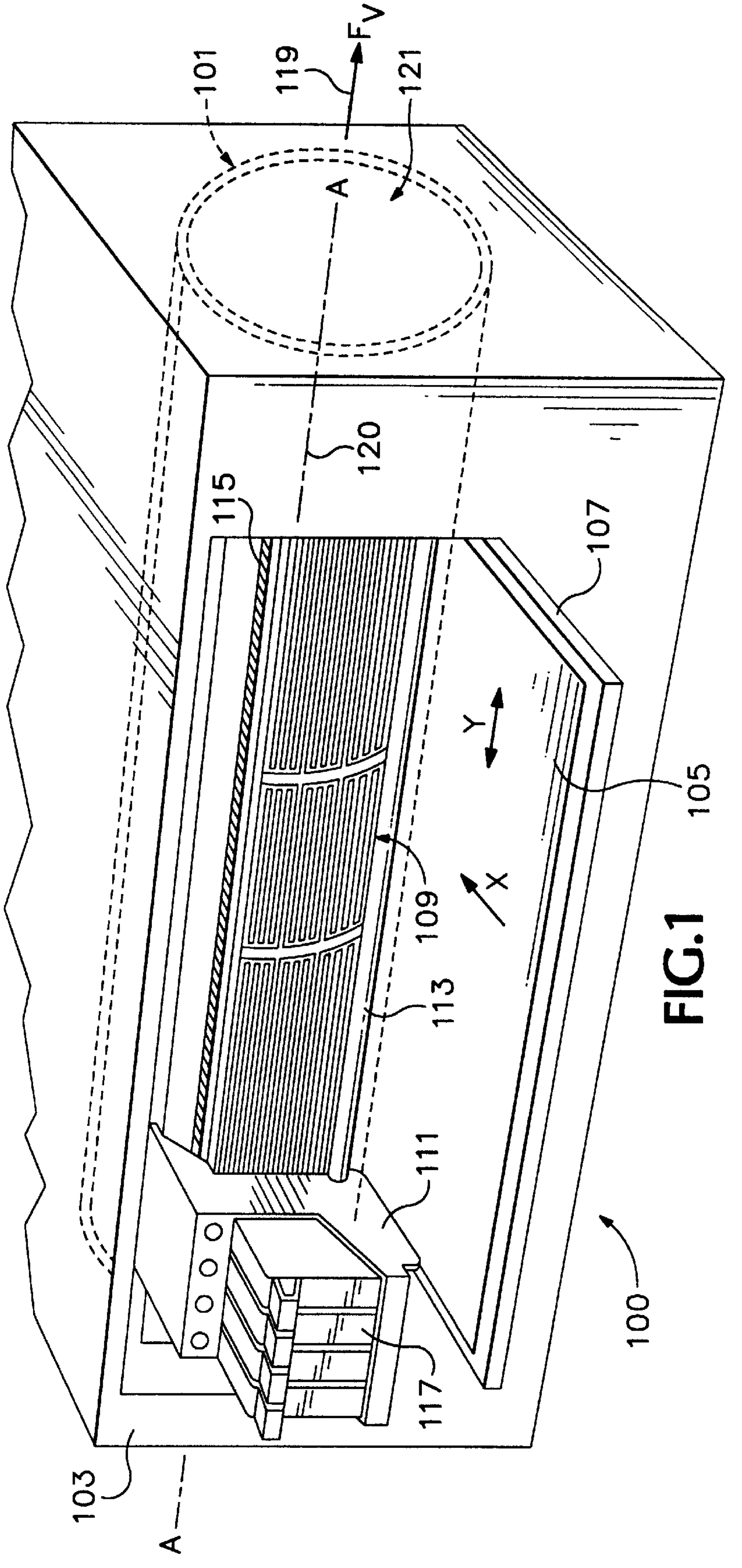
FIG. 1 is a perspective view of an ink-jet hard copy apparatus in accordance with the present invention.

FIG. 1 depicts an ink-jet printer 100 which employs a vacuum drum paper holddown 101 in accordance with the present invention. It will be recognized by those skilled in the art that a drum type platen implementation is only one of a variety of platen geometries that can be employed using the present invention. A housing 103 encloses the electrical and mechanical operating mechanisms of the printer 100.

Operation is administrated by an electronic controller (usually a microprocessor or application specific integrated circuit ("ASIC") controlled printed circuit board (not shown)) connected by appropriate cabling to the computer (not shown). It is well known to program and execute imaging and alpha-numeric character printing, print media handling, printer mechanism control functions, and logic with firmware or software instructions for conventional or general purpose microprocessors or ASIC's. Cut-sheet print media 105, loaded by the end-user onto an input tray 107, is fed by a suitable paper-path transport mechanism (not shown) in the Y-axis (see labeled arrow) to a cylindrical, vacuum drum holddown 101 which captures the sheet on the vacuum drum platen 109 and moves it to an internal printing station by the drum's rotation about its cylindrical longitudinal axis (shown as phantom line A—A, 120). A carriage 111, mounted on a slider 113, scans across the print medium in the X-axis (see labeled arrow). An encoder strip 115 and appurtenant known manner position-encoding devices (not shown) are provided for keeping track of the position of the carriage 111 at any given time. A set of individual ink-jet printing devices (pens or print cartridges) 117 are releasably mounted in the carriage 111 for easy access and replacement (generally, in a full color system, inks for the subtractive primary colors, cyan, yellow, magenta (CYM) and true black (K) are provided). Each ink-jet printing device 117 has one or more printhead mechanisms (not seen in this perspective) for "jetting" minute droplets of ink to form swaths of dots on adjacently positioned print media where graphical images or alphanumeric text are created using state of the art dot matrix manipulation techniques. [Note: a stationary or scanning, page-wide or full-page, ink-jet printing mechanism can also be employed.]

The vacuum force, Fv, as depicted by the arrow 119 is conventionally generated, such as with an appropriately configured exhaust fan (not shown), applied to the innermost surface, or "vacuum-side surface," of the vacuum drum holddown 101. The embodiments described herein are for a system using a vacuum force equivalent to a pressure in the range of approximately five to twenty inches water column ("WC").

Figure 2A:
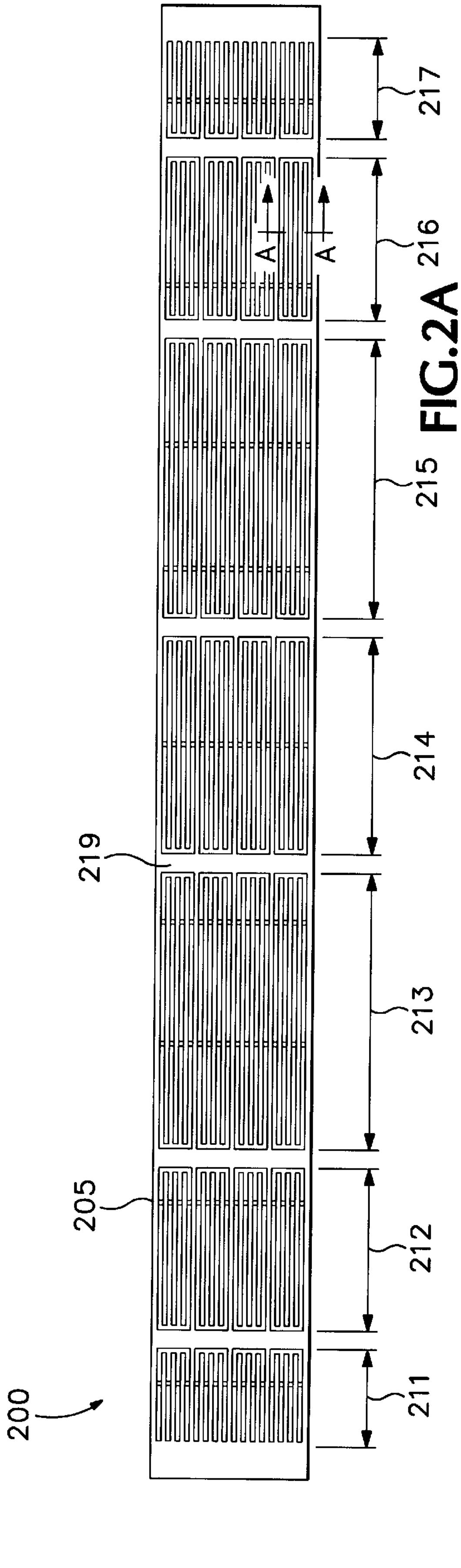
FIGS. 2A and 2B are a schematic depiction of a first embodiment in accordance with the present invention of a vacuum drum surface of a platen in the ink-jet hard copy apparatus as shown in FIG. 1.
Figure 2B:
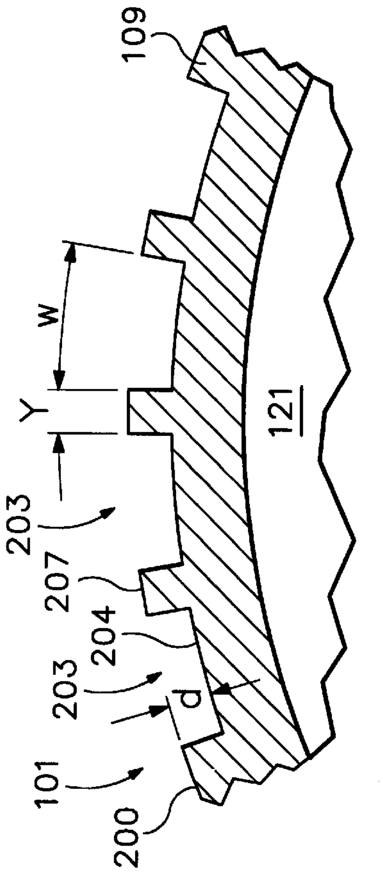

Turning now to FIGS. 2A and 2B in conjunction with FIG. 1, a first embodiment for a platen surface 200 for platen 109 is shown as a curvilineal sectional part for convenience of explanation in FIG. 2A, with cross-section A—A shown in FIG. 2B (outer border lines merely represent that this is one part of a repeating pattern about the surface of the drum 101. The section of the platen 109 in this embodiment is for a non-valved vacuum drum holddown 101. That is, whenever the vacuum producing mechanism is engaged (see FIG. 1, arrow 119), a vacuum is manifolded to the platen 109 and a suction force is spread across the platen surface 200. Vacuum channels 203 of the platen surface 200 are provided and in the preferred embodiment are characterized by shapes and dimensions which are specifically designed such that wet dye deposited on the print media by the hard copy means is not substantially redistributed within the print media by the vacuum force distributed by the channels. Dye redistribution results from the use of vacuum and uneven dye distribution results in print quality defects. Low vacuum levels and the use of fine surface texture on the drum minimize dye redistribution.

To this end, the channels are individually fluidically coupled to the vacuum force Fv by holes 205 through the associated channel floor 204 from the channels into the center cavity 121 of the drum holddown 101. The holes have a diameter in the range of approximately 0.4 to 0.7 millimeter ("mm"). The platen channel sizes are exaggerated for purposes of illustration. In a commercial implementation for use in a wet dye hard copy apparatus, the channels should have a cross-sectional width "w"—namely, in a direction parallel to the paper feed axis—in the range of approximately 0.7 to 1.5 mm. (For convenience of explanation, channel axes of symmetry are referred to hereinafter in context as merely the "axis."). The channels major axis length with respect to the width of the platen parallel to the spin axis 120 will be relative to the specific embodiment. The channels have a depth "d" into the surface of the platen surface 200 in the range of approximately 0.2 to 0.7 mm. Between each channel is a rib; the ribs have a cross-sectional surface width "r" in a direction parallel to the paper feed axis in the range of approximately 0.7 mm to 1.5 mm. For an exemplary drum holddown 101 having a circumference of approximately 170 mm, the construct shown thus represents an approximately 11.25-degree section of the entire platen surface 200; in other words, the pattern repeats on a 2.85-degree rotation circumferentially about the surface.

As paper feed is relatively oriented with respect to a particular hard copy apparatus implementation, it will be recognized by those skilled in the art that the channels and their interspaced ribs can be rotated with respect to paper feed axis directions, depending upon the actual, commercial embodiment.

To handle a variety of print media widths, longitudinal axis A—A width of the drum platen surface 200 is broken up into five longitudinal surface sectors 211, 212, 213, 214, 215, 216, 217. Each sector 211–217 is separately ported to the vacuum. Between the sectors 211–217 are platen surface curvilinear areas 219 that are not subject to the vacuum force in order to facilitate removal of the paper sheet once page printing is complete. For example, these curvilinear areas 219 can be selectively engaged by a set of rake tangs (not shown) to lift the leading edge of the paper sheet away from the surface 200 as would be well known in the art. It is also known to used a positive air pressure mechanism (not shown) to lift the leading edge to facilitate removal.

Figure 3A:
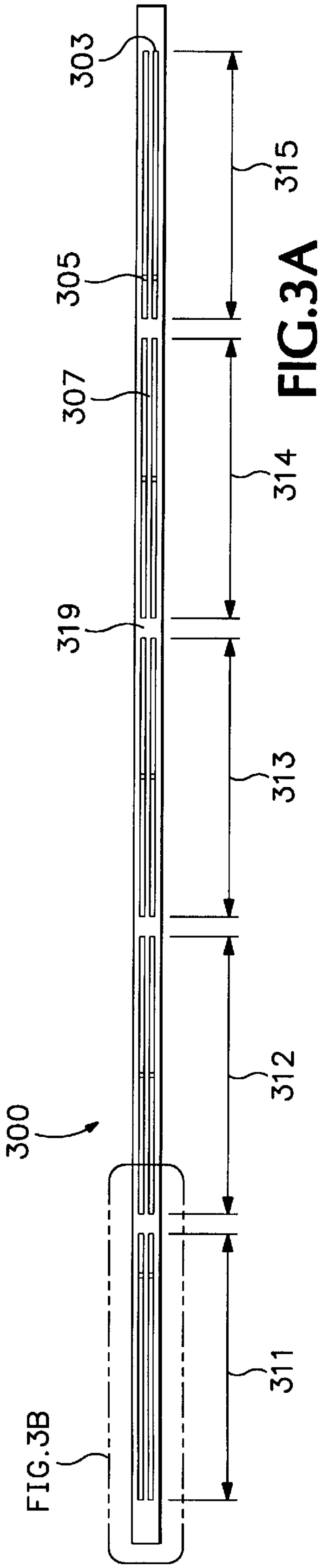
FIGS. 3A and 3B are a schematic depiction of a second embodiment in accordance with the present invention of a vacuum drum surface of a platen in the ink-jet hard copy apparatus as shown in FIG. 1.
Figure 3B:
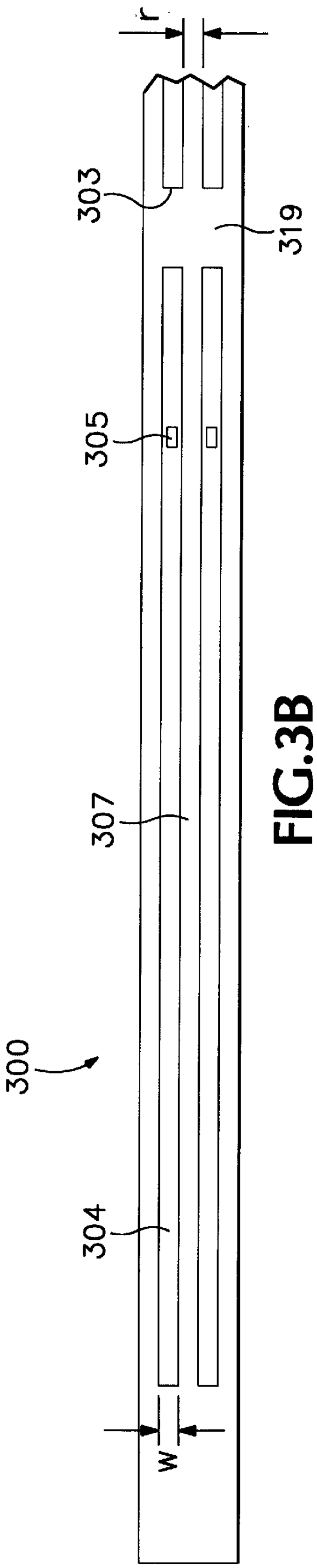

In conjunction with FIG. 1, FIGS. 3A–3B shows another embodiment for a non-valved platen surface 300, again shown as a curvilinear sectional part for convenience of explanation. For "plain" paper—e.g., twenty-pound, white —and a water-based ink having a viscosity of approximately two-Centipoise, it has been found that the surface pattern provides an optimized distribution of vacuum force across a sheet of print media and in that the vacuum holddown does not draw wet dye from its initial deposition dispersion to create visible print artifacts.

The channels 303 have a cross-sectional width "w" in the range of approximately 0.7 to 1.5 mm. The channels 303 have a depth "d" into the surface of the platen surface 300 in the range of approximately 0.2 to 0.7 mm. Between each channel 303 is a rib 307; the ribs have a cross-sectional surface width "r" in the range o approximately 0.7 to 1.5 mm. The vacuum holes 305 have a diameter in the range of approximately 0.4 to 0.7 mm. For an exemplary drum holddown 101 having a circumference of approximately 170 mm, the construct shown thus represents an approximately 2.8346-degree section of the entire platen surface 300; in other words, the pattern repeats on a 2.8346-degree rotation circumferentially about the surface, for a total of one-hundred and twenty-seven such sections.

As in the embodiment of FIGS. 2A and 2B, the surface structure is again divided into longitudinal axis A—A sectors 311, 312, 313, 314, 315.

Figures 4A, 4B, 4C, 5:
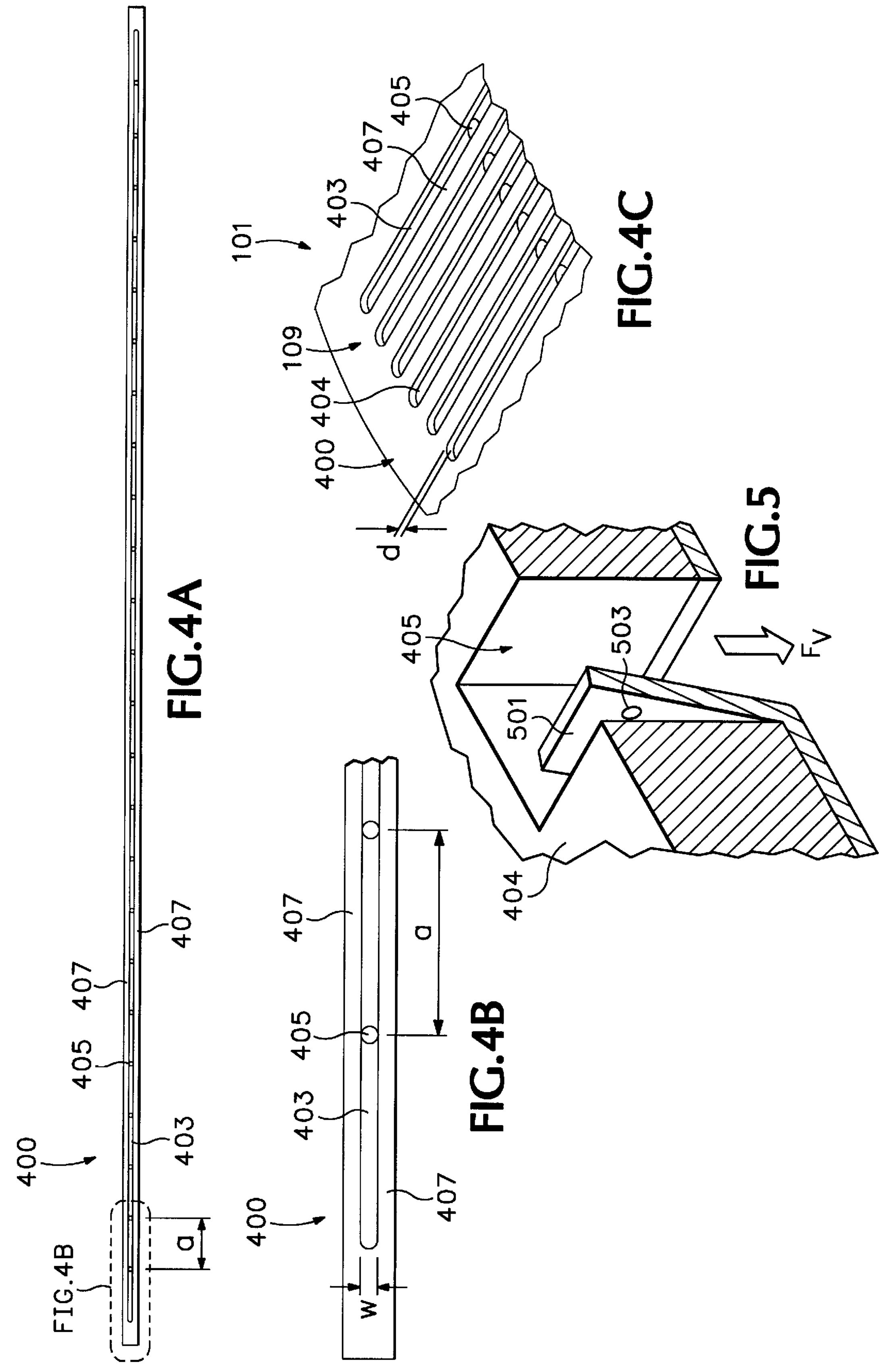

FIGS. 4A–4C embodiment for a platen surface 400 is shown as a curvilineal sectional part for convenience of explanation. The platen 109 in this embodiment is for a valved vacuum drum holddown 101. In other words, the platen surface 400 have vacuum ports 405 that are controlled, such as by valve mechanisms as taught in co-pending Rhodes and Rasmussen applications referenced hereinabove, to provide a vacuum force only for sectors on which a print medium is present.

The channels 403 have a cross-sectional width "w" in the range of approximately 0.7 to 1.2 mm. The channels 403 have a depth "d" into the surface of the platen surface 400 in the range of approximately 0.7 to 2.0 mm. Between each channel 403 is a rib 407; the ribs each have a cross-sectional surface width "r" in the range of 1.0 to 2.5 mm. The vacuum ports 405 in the floor 404 of each channel 403 have a diameter in the range of 0.7 to 1.2 mm. The vacuum ports 405 are spaced "a" across the platen's longitudinal axis approximately 10.0 mm apart. For an exemplary drum holddown 101 having a circumference of approximately 170 mm, the construct shown thus represents an approximately 2.022-degree section of the entire platen surface 400; in other words, the pattern repeats on a 2.022-degree rotation circumferentially about the surface, for a total of one-hundred and twenty-seven such sections.

FIG. 5 depicts one embodiment of a valved vacuum port 405, as disclosed by Rasmussen in detail. In FIG. 5, a flap 501, biased to an open position and having a vacuum bleed hole 503, is mounted below the platen channel floor 404 within the vacuum port 405 to act as a gate valve under a predetermined vacuum force, Fv, to close off the vacuum passageway between the associated channel and the vacuum generating mechanism except when a region of sheet paper covers the channel.

A variety of mechanisms for removing a sheet of paper being held on a vacuum hole controlled vacuum holddown 101—such as blowers, selectable lift fingers, and the like—are known in the art and can be employed in conjunction with the present invention. Further explanation of those mechanisms is not necessary to an understanding of the present invention.

As will be recognized by a person skilled in the art, the described embodiment can be altered to accommodate specific design needs. The platen size, the number of vacuum channeling constructions in the platen can be altered to fit any particular implementation. In this sense, the preferred embodiment can be tailored to the specific design of the hard copy apparatus. In a wet dye printing apparatus, the dimensions of the channels and ports should be optimized such that print artifacts are not created by vacuum pulling wet dye through the capillaries of the medium. Factors such as paper composition, dye composition, and the like as would be known to a person skilled in the art will vary the implementation specification. To generalize, it has been found that an open/closed flow ratio of approximately 100:1 is appropriate. Staggering the location of each diaphragm vacuum plenum valve of the mechanism for manifolding the vacuum force for a valved system as in embodiment of FIGS. 4A–4C is beneficial as larger detail features of the specific valve design can reduce sensitivities to manufacturing and assembly tolerances.

It is known in the art that print media and associated hard copy apparatus are generally categorized as A-size, e.g, ranging from 5×7-inches to 8.5×14-inches (or "legal"), and sequentially increasing to B-size, C-size and D-size which is for large engineering plots, blueprints and the like. The present invention can be adapted to each of these apparatus in accordance with general engineering principles and practices.

The foregoing description of the exemplary embodiment of the present invention has been presented for purposes of illustration and description. It is not intended to be exhaustive or to limit the invention to the precise form or to exemplary embodiments disclosed. Obviously, many modifications and variations—particularly for example in the manifold design—will be apparent to practitioners skilled in this art. Moreover, while the current best mode currently is shown in the nature of a multi-piece assembly or construction, unitary forms which can be designed using sophisticated, known manner molding techniques are also within the scope of the invention. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. A platen surface structure for a vacuum holddown of a hard copy means for printing with wet dye on print media, the hard copy means having a vacuum generating means for producing a predetermined vacuum force, the structure comprising:

the vacuum holddown having a platen;

the platen having a first surface for receiving print media thereon, the first surface having predetermined width dimension in a predetermined first axis of symmetry, and the first surface having a plurality of vacuum channels distributively arranged in parallel wherein each of the channels is substantially parallel to the first axis of symmetry, adjacent channels having substantially identical predetermined channel shape and channel dimensions;

each of the channels has at least one vacuum port associated therewith, fluidically coupling each of the channels, respectively, to the vacuum generating means, each of the channels are separated from adjacent channels thereto by platen surface structure ribs, wherein each of the ribs is substantially parallel to the first axis of symmetry, such that the ribs form a print media receiving surface; and the ribs having predetermined rib shape and rib dimensions and the channels have the predetermined channel shape and channel dimensions such that the vacuum force is distributed through the channels and imparted to regions of print media received on the ribs and spanning the channels to hold the print media to the platen first surface, wherein the first surface provides leading and trailing edge holddown on the platen.

2. The platen surface structure as set forth in claim 1, comprising:

the structure having surface geometries such that wet dye deposited on the print media by the hard copy means is not substantially redistributed within the print media by the vacuum force distributed by the channels and imparted to the print media between the ribs.

3. The platen surface structure as set forth in claim 1, comprising:

the platen surface structure is arranged to have a plurality of channels wherein each of the channels has a major axis substantially parallel to the first axis of symmetry and a channel minor axis perpendicular to the major axis and parallel to a print media receiving axis.

4. The platen surface structure as set forth in claim 3, comprising:

each of the channels has a plurality of vacuum ports wherein each of the ports provides a valved coupling between each of the channels, respectively, and the vacuum generating means and wherein the ports are distributed along the major axis within each of the channels at locations therein associated with predetermined print media widths and such that wet dye deposited on the print media by the hard copy means is not substantially redistributed within the print media by the vacuum force through the ports and as distributed by the channels and imparted to the print media.

5. The platen surface structure as set forth in claim 1, comprising:

the platen surface structure has a second axis of symmetry as a print media receiving axis substantially perpendicular to the first axis of symmetry; and the platen surface structure is arranged in discrete channel sectors along the first axis such that the channels are distributively arranged in a plurality of groups within each of the sectors, and each of the channels in a group has a channel major axis substantially parallel to and shorter than the first axis of symmetry and a channel minor axis perpendicular to the major axis parallel to the print media receiving axis.

6. The platen surface structure as set forth in claim 5, comprising:

each of the discrete channel sectors is distributively arranged across the platen surface structure in the first axis of symmetry, having a first axis of symmetry sector width dimension and locations on the platen associated with predetermined variations of print media width dimensions.

7. The platen surface structure as set forth in claim 5, comprising:

the platen surface structure has a second axis of symmetry further comprising a print media receiving axis substantially perpendicular to the first axis of symmetry, each of the ribs having a first axis of symmetry rib dimension less than the sector first axis of symmetry sector width dimension such that the sectors form a repeated pattern of channel groups in the platen first surface and a print media receiving axis rib dimension, and each of the channels and each of the ribs has a first axis channel dimension and a second axis channel dimension wherein the vacuum force is distributed through the channels to hold the print media to the ribs such that wet dye on the media is not substantially redistributed within the media by the vacuum force in the channels.

8. The platen surface structure as set forth in claim 5, comprising:

the platen surface structure has a second axis of symmetry further comprising a print media receiving axis substantially perpendicular to the first axis of symmetry;

each of the ribs having a first axis rib dimension approximately equal to the first surface predetermined width dimension, and a second axis rib dimension such that the sectors form a repeated pattern of channel groups in the platen first surface segregated by an individual one of the ribs; and each of the channels has a first axis channel dimension and a second axis channel dimension wherein the vacuum force is distributed through the channels to hold the print media to the ribs such that wet dye on the media is not substantially redistributed within the media by the vacuum force within the channels.

9. The platen surface structure as set forth in claim 1, comprising:

the holddown is a vacuum drum cylindrical construct wherein the first axis of symmetry is the cylindrical construct longitudinal axis and the axis of rotation of the drum, the first surface is an outer surface of the drum adapted for receiving print media thereon circumferentially about the longitudinal axis, and the construct having an inner chamber formed by an inner surface of the drum, the chamber having the predetermined vacuum force coupled thereto and to the channels via the ports.

10. The platen surface structure as set forth in claim 4, comprising:

the channels are parallel to the first axis.

11. A vacuum platen device for an ink-jet apparatus having a means for producing a vacuum Fv, the device comprising:

a platen having an outer platen surface and an inner platen surface wherein print media sheets are sequentially delivered to the outer platen surface from a predetermined media delivery direction, the platen having a first axis perpendicular to the predetermined media delivery direction and a second axis parallel to the predetermined media delivery direction;

the outer platen surface having an outer platen surface structure having a repeated pattern of vacuum channels in the outer platen surface wherein each of the channels has a channel major axis substantially parallel to the first axis and a channel minor axis substantially parallel to the second axis;

the outer platen surface structure having platen surface structure ribs, each of the ribs separating a pair of the vacuum channels, the ribs having a rib major axis substantially parallel to the first axis and a rib minor axis substantially parallel to the second axis; and each of the vacuum channels having a least one vacuum port from the outer platen surface to the inner platen surface, fluidically coupling each of the vacuum channels to the means for producing a vacuum, respectively, and wherein the ribs have a predetermined rib shape and rib dimensions and the channels have a predetermined channel shape and channel dimensions such that the vacuum force is distributed through the channels and imparted to regions of the print media received on the ribs and spanning the channels to hold the print media to the outer platen surface, and wherein the platen further provides print media leading edge and print media trailing edge holddown.

12. The device as set forth in claim 11, comprising:

the platen has a surface geometry wherein wet dye deposited on the print media by the ink-jet apparatus is not substantially redistributed within the print media by the vacuum force distributed by the channels and imparted to the print media between the ribs.

13. The device as set forth in claim 11, comprising:

the platen is substantially cylindrical, having the first axis as a longitudinal spin axis and the second axis as a media receiving axis such that print media sheets are received by the platen outer surface circumferentially about the spin axis.

14. The device as set forth in claim 11, comprising:

the outer platen surface structure having predetermined groups of vacuum channels distributively arranged as a plurality of circumferential platen surface structure sectors, wherein each of the platen surface structure sectors are distributively arranged longitudinally across the platen parallel to the longitudinal spin axis such that combinations of the sectors are associated with predetermined print media cross-dimensions.

15. The device as set forth in claim 14, comprising:

each of the ports is gated such that sectors are selectively activated only when a sector is covered by a media of the predetermined print media cross-dimension associated therewith.

16. The device as set forth in claim 15, comprising:

the platen surface structure is arranged to have a plurality of channels circumferentially about the platen such that each of the channels has a major axis substantially parallel to the longitudinal axis and a channel minor axis perpendicular to the major axis.

17. The device as set forth in claim 16, comprising:

the ribs are wider than the channels directionally in the print media receiving axis.

18. An ink-jet hard copy apparatus having a means for generating a predetermined vacuum force Fv, comprising:

a housing;

mounted to the housing, means for ink-jet printing;

mounted to the housing, means for holding cut-sheet print media;

mounted within the housing and associated with the means for holding cut-sheet print media, vacuum drum means for sequentially transporting individual sheets of print media from the means for holding to a printing station adjacent the means for ink-jet printing; and the vacuum drum means, having a predetermined longitudinal spin axis and a predetermined axial length and including an inner surface forming a vacuum chamber fluidically coupled to the means for generating a vacuum force, an outer surface positioned adjacently to the means for holding cut-sheet print media, forming a cylindrical platen for sequentially receiving individual sheets of media from the means for holding, the outer surface including a plurality of vacuum channels across the outer surface, each of the channels having at least one vacuum port extending from an interior of a respective channel to the inner surface such that the predetermined vacuum force is coupled to each of the channels and distributed thereby across the platen, each of the channels having a predetermined channel length parallel to the spin axis and a predetermined circumferential channel width wherein the channel length is approximately equal to or less than the predetermined axial length of the vacuum drum means and the circumferential channel width is less than a predetermined dimension wherein the vacuum force distributed by respective channels provides leading edge and trailing edge holddown of the print media.

19. The apparatus as set forth in claim 18, comprising:

vacuum flow distributed by a respective channel is of a value greater than or equal to a value for securing a sheet spanning a respective channel and less than a value resulting in redistribution of wet dye deposited by the means for ink-jet printing on the sheet spanning a respective channel.

20. A method for using a known vacuum force for holding print media during a wet dye printing operation, comprising the steps of:

providing a platen having print media platen surface structure having vacuum channels oriented, shaped, and dimensioned across the platen in accordance with a predetermined geometry for ensuring leading edge and trailing edge holddown of the print media;

delivering the print media to the platen; and holding the print media to the platen with the vacuum force distributed through the channels during printing, wherein the predetermined geometry is a function of dye flow characteristics based upon known dye composition and known print medium composition such that print artifacts are not created by the known vacuum force pulling wet dye through capillaries of the medium.

* * * * *